(12) United States Patent
Umeda

(10) Patent No.: US 6,784,583 B2
(45) Date of Patent: Aug. 31, 2004

(54) ROTARY ELECTRIC MACHINE

(75) Inventor: Atsushi Umeda, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/073,857

(22) Filed: Feb. 14, 2002

(65) Prior Publication Data
US 2002/0113515 A1 Aug. 22, 2002

(30) Foreign Application Priority Data
Feb. 20, 2001 (JP) ........................................ 2001-043058

(51) Int. Cl.⁷ .............................................. H02K 3/00
(52) U.S. Cl. ....................... 310/179; 310/184; 310/180; 310/201
(58) Field of Search ................................ 310/184, 260, 310/71, 198, 179, 180, 201, 202, 203, 208

(56) References Cited

U.S. PATENT DOCUMENTS

| | | | | |
|---|---|---|---|---|
| 4,144,470 A | * | 3/1979 | Auinger ...................... | 310/198 |
| 4,710,661 A | * | 12/1987 | Gjota ......................... | 310/198 |
| 4,910,421 A | * | 3/1990 | VanSchaick et al. ...... | 310/68 D |
| 5,122,705 A | * | 6/1992 | Kusase et al. ............. | 310/68 D |
| 5,270,602 A | * | 12/1993 | Takehara .................... | 310/198 |
| 5,444,355 A | | 8/1995 | Kaneyuki et al. ........... | 322/58 |
| 5,559,385 A | * | 9/1996 | Yalovega et al. ........... | 310/198 |
| 5,686,774 A | * | 11/1997 | Slavik et al. ............... | 310/198 |
| 5,825,111 A | * | 10/1998 | Fei ............................. | 310/179 |
| 5,936,326 A | * | 8/1999 | Umeda et al. .............. | 310/179 |
| 5,955,810 A | | 9/1999 | Umeda et al. .............. | 310/208 |
| 5,998,903 A | | 12/1999 | Umeda et al. .............. | 310/179 |
| 6,326,715 B1 | * | 12/2001 | Asao et al. ................. | 310/180 |
| 6,469,413 B1 | * | 10/2002 | Oohashi et al. ............. | 310/184 |
| 6,515,392 B2 | * | 2/2003 | Ooiwa ........................ | 310/179 |
| 6,522,043 B2 | * | 2/2003 | Masegi ....................... | 310/180 |
| 6,570,289 B1 | * | 5/2003 | Liang et al. ................ | 310/179 |

FOREIGN PATENT DOCUMENTS

| | | |
|---|---|---|
| DE | 32 02 958 A1 | 8/1983 |
| EP | 0 18 835 A1 | 11/1980 |
| EP | 0 534 153 A1 | 3/1993 |
| EP | 0 828 335 A1 | 3/1998 |
| JP | 33743 B | 2/1919 |
| JP | 148045 B | 10/1941 |
| JP | 54-39805 A | 3/1979 |
| JP | 4-8140 A | 1/1992 |
| JP | 2927288 B | 5/1999 |

* cited by examiner

Primary Examiner—Tran Nguyen
Assistant Examiner—Leda Pham
(74) Attorney, Agent, or Firm—Oliff & Berridge, PLC

(57) ABSTRACT

A rotary electric machine having an armature winding that includes three first phase-windings that form a Δ-connection winding having output ends and three second phase-windings that are respectively connected in series to the output ends to form a star-connection three-phase winding having output ends connected to a rectifier unit.

21 Claims, 10 Drawing Sheets

ROTARY ELECTRIC MACHINE

CROSS REFERENCE TO RELATED APPLICATION

The present application is based on and claims priority from the following Japanese Patent Application 2001-43058, filed Feb. 20, 2001, the contents of which are incorporated herein by reference.

BACKGROUND OF THE INVENTION

1. Field of the Invention

The present invention relates to a rotary electric machine of a generator or the like to be mounted in a passenger car, a truck or another vehicle.

2. Description of the Related Art

Recently, as the quality of vehicles improves, vehicle AC generators to be mounted on engines are demanded to decrease magnetic noise during the operation thereof. On the other hand, as the electric load for safety devices or the like has been increasing, demand for increasing the output power of the AC generator has been growing. Therefore, it is desired to provide a compact, quiet and powerful vehicle AC generator at a low price.

In order to satisfy the above-need, various arrangements for decreasing noises have been proposed. For example, U.S. Pat. No. 5,122,705 (or its corresponding publication JP-A-4-8140) discloses a pair of parallel three-phase windings, one is a Δ-connection winding and the other is a star-connection winding, in which the phase of the voltage induced in a phase-winding is $\pi/6$ different from another. The voltage induced in one phase-winding of one of the pair of three-phase-windings has the same phase as voltage across two phase-windings of the other of the pair of three-phase windings, while the phase of current flowing in each phase-winding is $\pi/6$ different from another, so that high frequency components included in the currents, which cause magnetic noises, can be cancelled or decreased by one another.

In the arrangement stated above, in order to equalize the voltage across two phase-windings of the Δ-connection winding and the voltage across two phase-windings of the star-connection winding with each other, it is necessary that the number of turns of the Δ-connection winding is $\sqrt{3}$ times as many as the number of turns of the star-connection winding. However it is impossible to provide such an irrational number of turns. Therefore, in the three-phase windings, which generate different voltage from each other, circulation current flows from one of the three-phase winding that generates higher voltage to the other, output current decreases and temperature of the generator rises, resulting in low efficiency of the generator.

In order to reduce the above problems, the number of turns of both the three-phase windings is increased to provide a ratio that is approximate to $1:\sqrt{3}$. However, it can not prevent the AC generator from increasing in size and temperature rise.

U.S. Pat. No. 5,998,903 (or its corresponding publication JP-A-11-155270) discloses an arrangement in which electric conductors are bent and connected together to form an armature winding. However it is necessary for one group of phase-windings of the armature winding having number of turns different from another group of windings to have a different bent shape. Therefore, if the armature winding includes windings of different turns, the structure becomes so complicated that production cost may increase very much.

The present invention has been made in view of the foregoing problems, and an object of the invention is to provide a compact, powerful, highly efficient rotary electric machine at a low cost even if windings generating different voltages are included therein.

SUMMARY OF THE INVENTION

In order to solve the above stated problems, in a rotary electric machine according to the invention includes an armature winding is comprised of three first phase-windings that form a Δ-connection winding having output ends and three second phase-windings that are respectively connected in series to the output ends to form a star-connection three-phase winding having output ends connected to a rectifier unit.

Because each phase-winding of the star-connection three-phase winding is connected in series to the Δ-connection three-phase winding, circular current can be prevented even if the voltages induced by the plurality of three-phase windings are different from each other. Therefore, output power loss due to the circulation current can be eliminated. Therefore, a compact, powerful and highly efficient rotary electric machine can be provided.

Preferably, the above three-phase windings are mounted in the stator core so that the phase of current flowing in the first phase-windings is $\pi/6$ in electric angle different from the phase of current flowing in the second phase-winding. Accordingly, high frequency components that may cause magnetic noise can be cancelled by combining the plurality of three-phase windings.

It is also preferable that each of the plurality of phase-windings has the same number of turns. It is possible to provide the phase-windings in the same winding process. As a result, manufacturing facilities can be simplified and work efficiency can be improved, so that the production cost can be reduced.

It is preferable that the above armature winding is comprised of a plurality of electric conductors welded together. With this structure, coil ends of the armature winding can be formed uniform or regular, so that the resistance of the armature winding can be drastically reduced. In addition, bending and welding works can be simplified, resulting in simplification of the manufacturing facilities and in drastically reduced production cost.

It is preferable that each of the electric conductors has a rectangular cross-section. With this feature, the space factor of the conductors to the slot of the stator core can be improved, thereby reducing the resistance of the armature winding. In addition, the rectangular cross section makes the electric conductors stiffer, so that vibration thereof can be effectively prevented.

It is preferable that the output ends of the Δ-connection winding are distributed at an end surface of the stator core in an angular range that is more than 180 degree. With this feature, wiring work at the output ends can be made easier, so that the productivity can be improved.

It is preferable that lead wires that form output ends of the plurality of three-phase windings are extended in radial directions so that they do not overlap one another. With this feature, the lead wires can be made shorter, so that the resistance of the armature winding can be reduced, and so that the lead wires can be prevented from vibrating.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
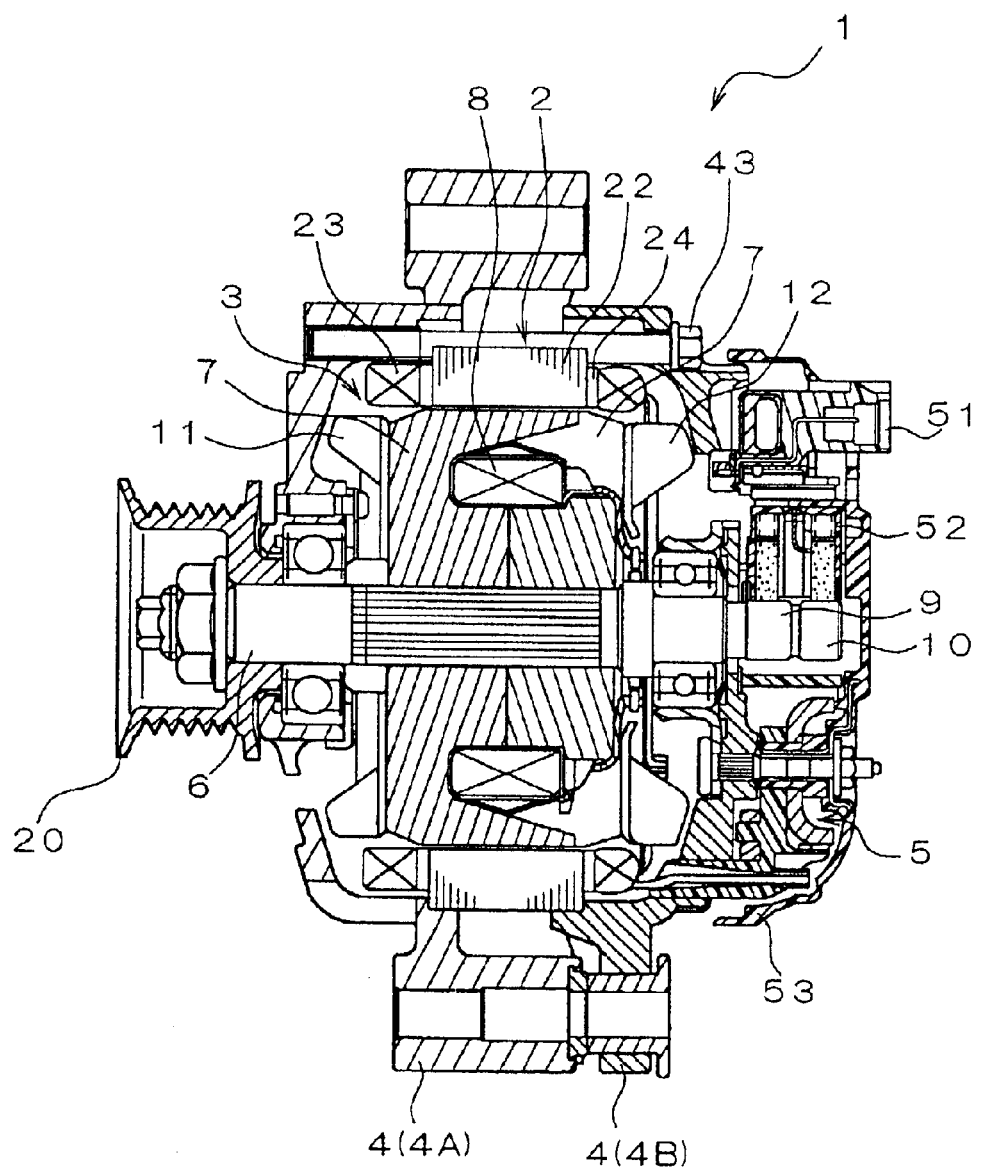
FIG. 1 is a view showing an overall vehicle AC generator according to a first embodiment of the invention.

A vehicle AC generator according to a first embodiment of the invention is described with reference to FIGS. 1–6. The vehicle AC generator 1 is comprised of a stator 2, a rotor 3, a frame 4, a rectifier unit 5, and so on.

The stator 2 is comprised of a stator core 22, an armature winding 23 mounted in the stator core 22, insulators 24 for insulating the armature winding 23 from the stator core 22. The stator core 22 is a ring-shaped laminate of a plurality of thin steel plate, which has a plurality (e.g. 72) of slots at the radially inside surface thereof. The armature winding 23 is comprised of a pair of three-phase windings 23A and 23B, whose phases are $\pi/6$ different from each other. The pair of three-phase windings 23A and 23B is distributed into the 72 slots.

The rotor 3 has a shaft 6 that rotates together and is comprised of a pole core 7, a field coil 8, slip rings 9 and 10, a mixed flow type cooling fans 11 and a centrifugal cooling fan 12. The shaft 6 is linked with a pulley 20 to be driven by an engine (not shown) mounted in a vehicle. The rotor 6 has twelve poles, and six slots of the stator core 22 correspond to each pole.

The frame 4 accommodates the stator 2 and the rotor 3 therein so that the rotor 3 can rotates about the shaft 6. The stator 2 is fixedly disposed around the pole core 7 of the rotor 3 at a certain gap. The frame 4 is comprised of a front frame 4A and a rear frame 4B, which are fastened to each other by a plurality of fastening bolts 43, thereby supporting the stator 2 and so on. The rectifier unit 5 is connected to lead wires that extend from the armature winding 23 to convert full-wave-three-phase AC voltage of the armature winding into DC voltage.

The above-described vehicle AC generator 1 rotates in a predetermined direction when torque is transmitted from an engine to the pulley 20 via a belt or the like. If exciting voltage is applied to the field coil 8 of the rotor 3 while rotating, the claw poles are magnetically excited so that three-phase AC voltage can be generated by the armature winding 23 and DC voltage can be provided at the output terminal of the rectifier unit 5.

Figure 2:
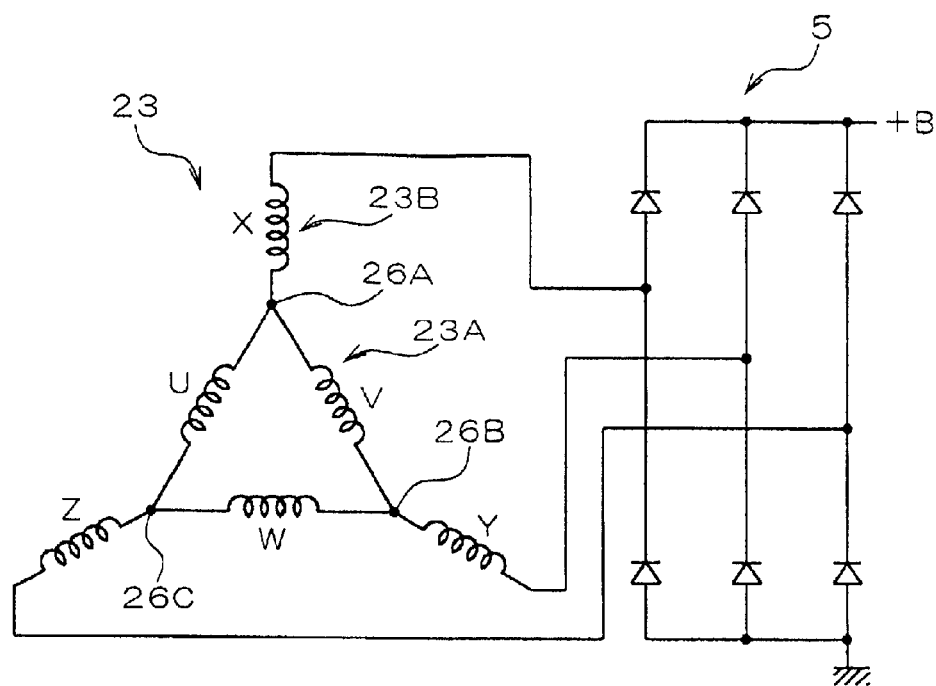
FIG. 2 is a wiring diagram of an armature winding.
Figure 4:
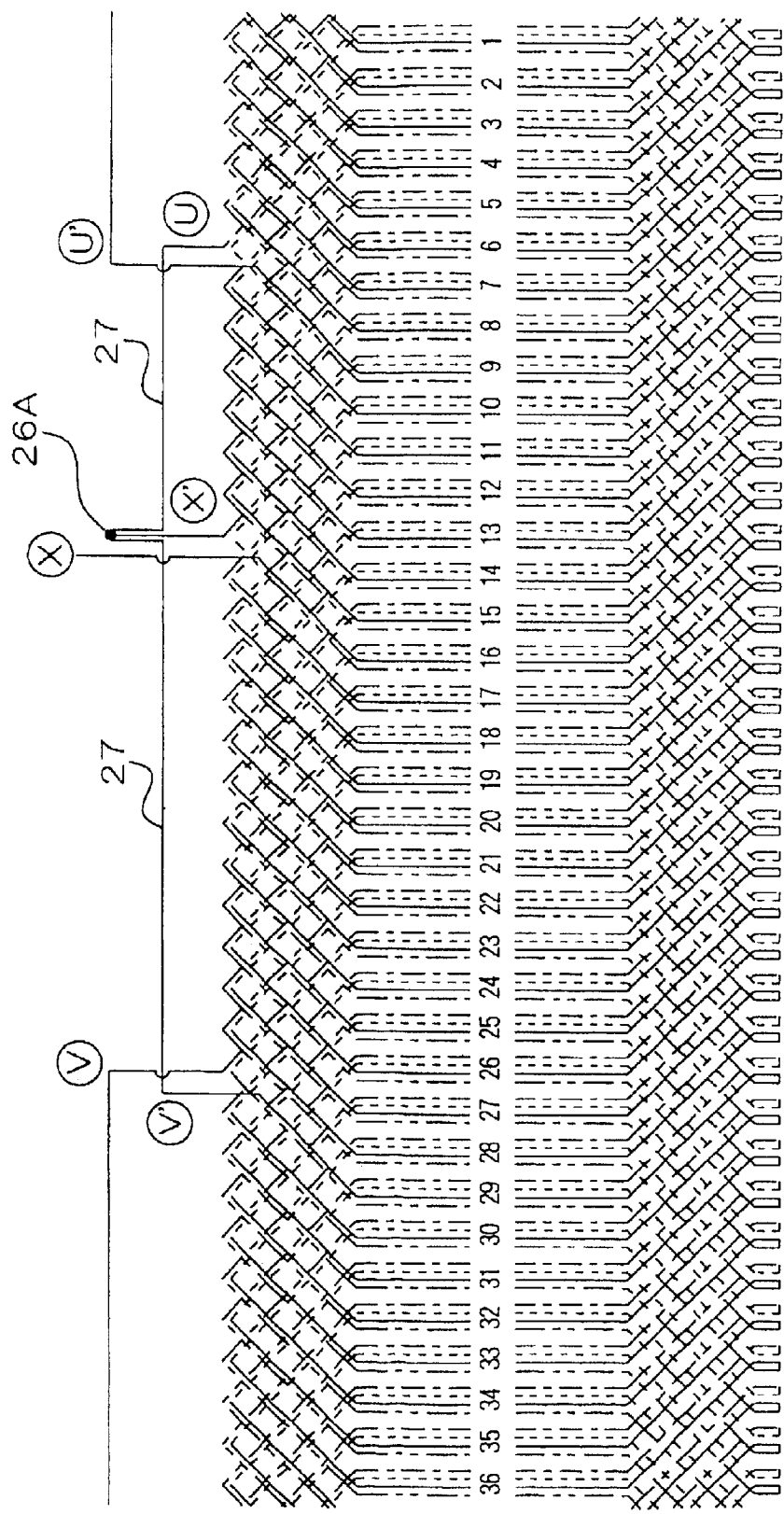
FIG. 4 is a wiring diagram of the armature winding.
Figure 5:
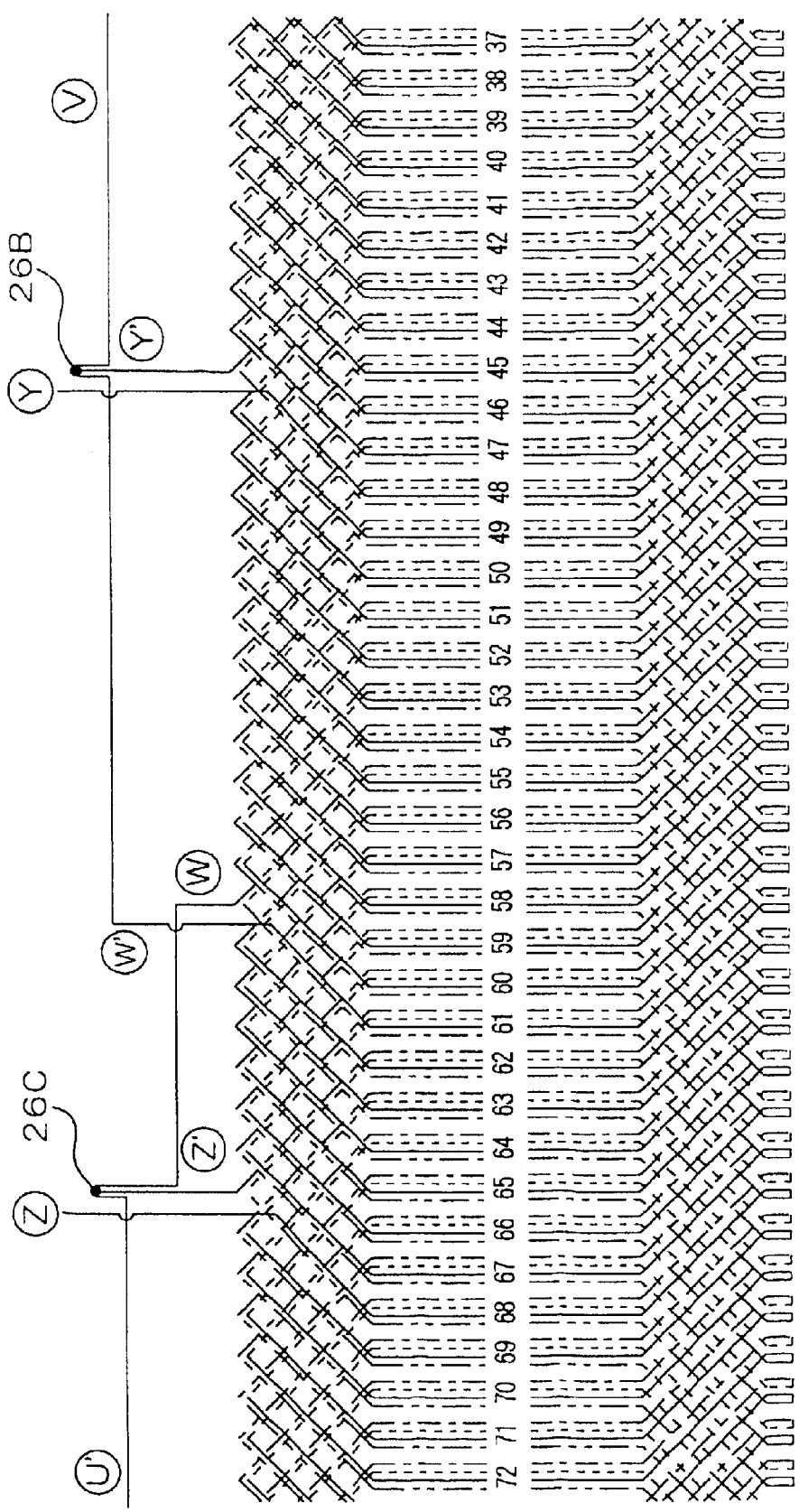
FIG. 5 is a wiring diagram of the armature winding.

As shown in FIG. 2, the armature winding 23 is comprised of a $\Delta$-connection three-phase winding 23A and a star-connection three-phase winding 23B. The $\Delta$-connection three-phase winding 23A is comprised of U phase-winding, V phase-winding and W phase-winding that are four slot-pitches ($2\pi/3$ radian in electric angle) shifted from each other and connected with each other to form a delta-connection three-phase winding. As shown in FIGS. 4 and 5, the U phase-winding is disposed in slots #9, #15, #21 . . . , the V phase-winding is disposed in slots #5, #11, #17 . . . that are respectively four slot-pitches shifted from the slots of the U phase-winding, and w phase-winding is disposed in slots #1, #7, #13 . . . , that are respectively four slot-pitches shifted from the slots of the V phase-winding.

The star-connection three-phase winding 23B is comprised of X phase-winding, Y phase-winding and z phase-winding. As shown in FIGS. 4 and 5, the X phase-winding is disposed in slots #10, #16, #22 . . . , the Y phase-winding is disposed in slots #6, #12, #18 . . . that are respectively four slot-pitches shifted from the slots of the X phase-winding, and Z phase-winding is disposed in slots #2, #8, #14 . . . , that are respectively four slot-pitches shifted from the slots of the Y phase-winding.

Figure 3:
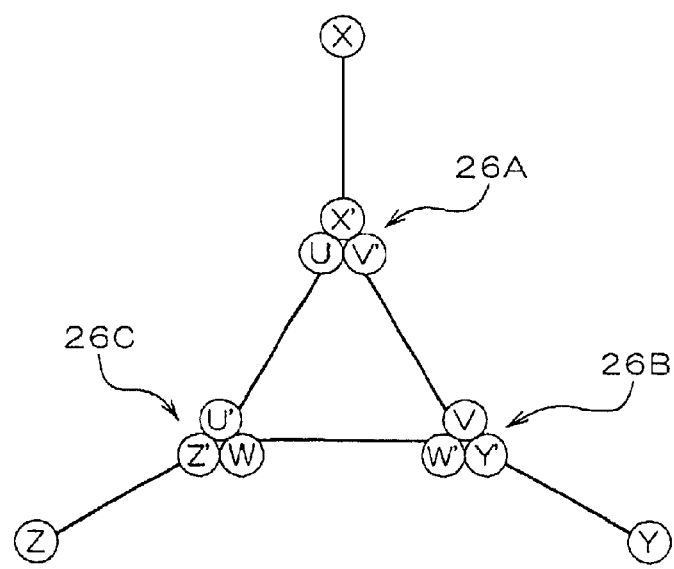
FIG. 3 is a supplementary diagram of the armature winding.

Thus, the pair of three-phase windings 23A and 23B is disposed in the slots that are a slot-pitch ($\pi/6$ in electric angle) shifted from each other. The X phase-winding, Y phase-winding and Z phase-winding of the star-connection three-phase winding 23B are respectively series-connected, at one ends thereof, to output connection ends 26A, 26B and 26C of the $\Delta$-connection three-phase winding 23A. The other ends of the X phase-winding, Y phase-winding and Z phase-winding are respectively connected to the rectifier unit 5. As a result, star-connection three-phase winding 23B are series connected to the $\Delta$-connection three-phase winding 23A, as shown in FIGS. 2 and 3.

In this embodiment, the number of turns of each of the U phase-winding, v phase-winding and w phase-winding of the three-phase winding 23A is 6, and the number of turns of each of the X phase-winding, Y phase-winding and Z phase-winding of the three-phase winding 23B is 3 that is the integer closest to the quotient of 6 divided by $\sqrt{3}$.

Figure 6:
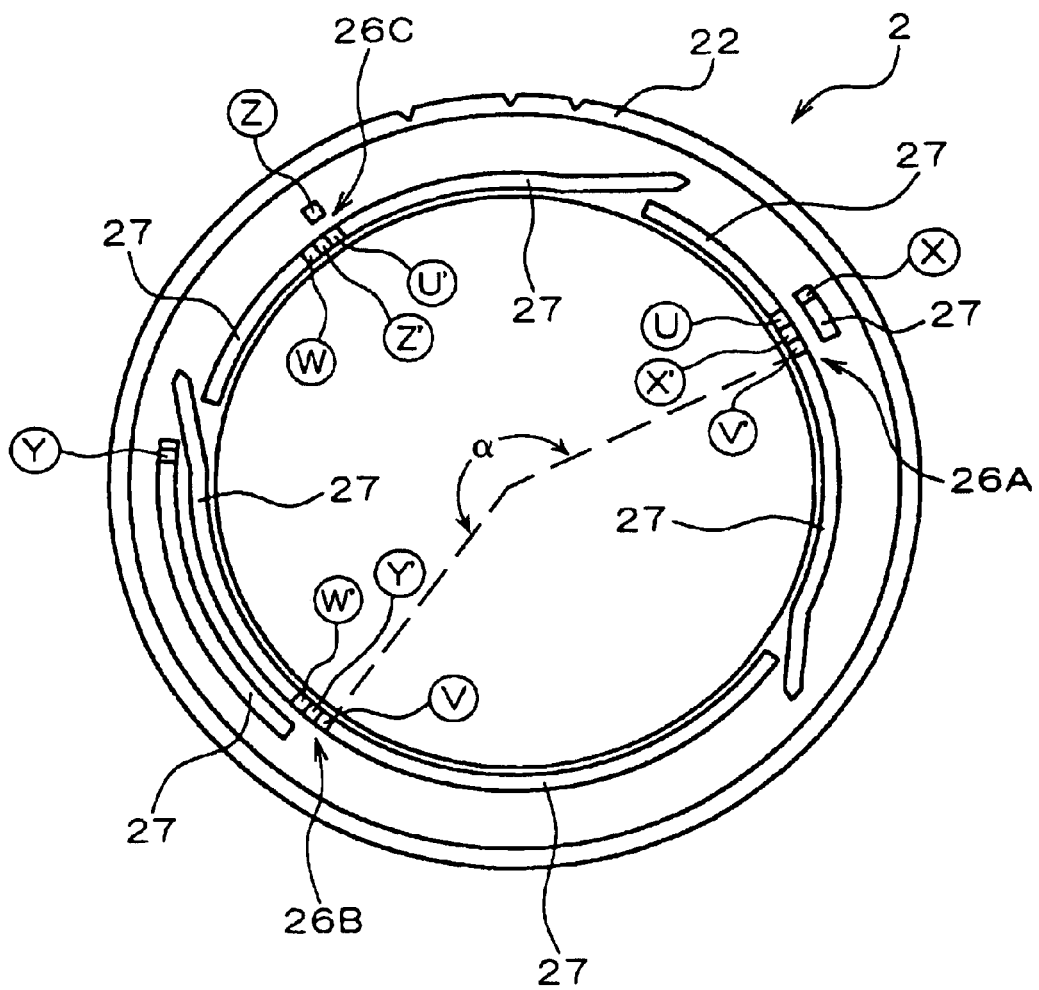
FIG. 6 is a schematic diagram of a stator showing connections and lead wires.

As shown in FIG. 6, the three connection ends 26A, 26B and 26C of the three-phase winding 23A are distributed over an area wider than 180° in angle $\alpha$ so that lead wires 27 that form the connection ends 26A, 26B and 26C may not overlap each other in the radial direction. Thus, it is easy to connect the pair of three-phase windings 23A and 23B and to shape the lead wires 27. In addition, the lead wires 27 can be made as short as possible.

In this embodiment, the voltage induced by the star-connection three-phase winding 23B is 0.86 times as high as the voltage induced by the $\Delta$-connection three-phase winding 23A. Because the pair of three-phase windings 23A and 23B is connected in series, no circulation current flows.

It is not necessary to arrange the numbers of turns of the pair of three-phase windings in order to equalize the induced voltages of the two phase-windings to each other. In other words, it is possible to set the number of turns of the pair of three-phase windings as desired.

Because the star-connection three-phase winding 23B is $\pi/6$ shifted from the $\Delta$-connection three-phase winding 23A, the counter electromotive forces are canceled by each other, thereby reducing magnetic noises. Because the $\Delta$-connection three-phase winding 23A and the star-connection three-phase winding 23B are connected in series, only the output ends of the three-phase winding 23B can be connected to the rectifier unit 5 to provide the output current of the vehicle AC generator 1. Therefore, only one rectifier unit 5 is necessary.

The three connection ends 26A, 26B and 26C are distributed over the area that is wider than 180° so that the lead wires may not overlap each other in the radial direction. Therefore, coil ends of the armature winding 23 can be made compact. In addition, the lead wires 27 can be made very short, so that the reliability of the vehicle AC generator 1 can be improved.

A vehicle AC generator 1 according to a second embodiment of the invention is described with reference to FIGS. 7–11. Because the vehicle AC generator according to the second embodiment is different from the vehicle AC generator according to the first embodiment in that an armature winding is comprised of a plurality of U-shaped conductor segments having a rectangular cross section. The following is the description about a stator that is different from the stator of the AC generator according to the first embodiment.

The armature winding 23 mounted in the slots 25 of the stator core 22 is formed of a plurality of conductor members. An even number (e.g. four) of the conductor members is disposed each slot 25. Four conductor members in one of the slots 25 are aligned in the radial direction and respectively disposed in an innermost layer, an inner middle layer, an outer middle layer and an outermost layer.

A conductor member 231a disposed at the innermost layer of one of the slots 25 is paired with a conductor member 231b disposed in the outermost layer of another slot 25 that is a pole-pitch (six slot-pitches) clockwise spaced apart therefrom. In the same manner, a conductor member 232a disposed in the inner middle layer of the same one of the slots 25 is paired with a conductor member 232b disposed in the outer middle layer of the slot 25 that is a pole-pitch clockwise spaced apart therefrom. These paired conductor members are connected by continuous turn portions 231c and 232c at an end of the stator core 22.

Figure 11:
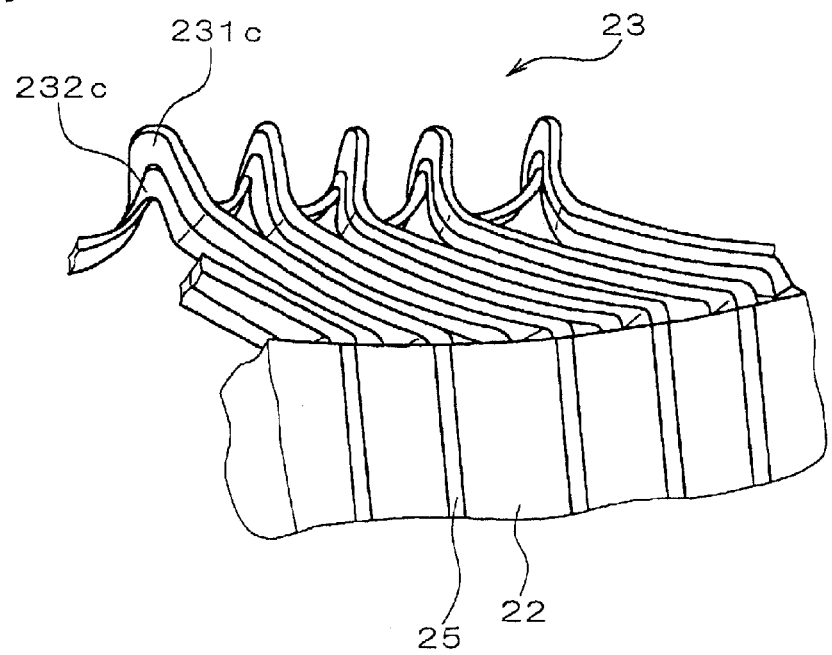
FIG. 11 is a perspective view showing a portion of the stator according to the second embodiment.

Accordingly, one end of the stator core 22, as shown in FIG. 11, the continuous wire that connects the conductor member 231b disposed in the outermost layer and the conductor member 231a disposed in the innermost layer via turn portion 231c encloses the continuous wire that connects the conductor member 232b disposed in the outer middle layer and the conductor member 232a disposed in the inner middle layer via turn portion 232c. Therefore, the turn portion 232c as a connecting portion of the paired conductor members is enclosed by the turn portion 231c as a connecting portion of the paired conductor members disposed in the same slots, at one end of the stator core 22. Thus, the conductor member 232b disposed in the outer middle layer and the conductor member 232a disposed in the inner middle layer are connected to form a middle layer coil end, and the conductor member 231a disposed in the outermost layer and the conductor member 231b disposed in the innermost layer are connected to form an outer layer coil end.

On the other hand, the conductor member 232a disposed in the inner middle layer of one of the slots 25 is paired with a conductor member 231a' disposed in the innermost layer of another slot 25 that is a pole pitch clockwise spaced apart therefrom. In the same manner, a conductor member 231b' disposed in the outermost layer of one of the slots 25 is paired with a conductor member 232b disposed in the outer middle layer of another slot 25 that is a pole pitch clockwise spaced apart therefrom. These conductor members are connected to each other at the other axial end of the stator core 22.

Figure 10:
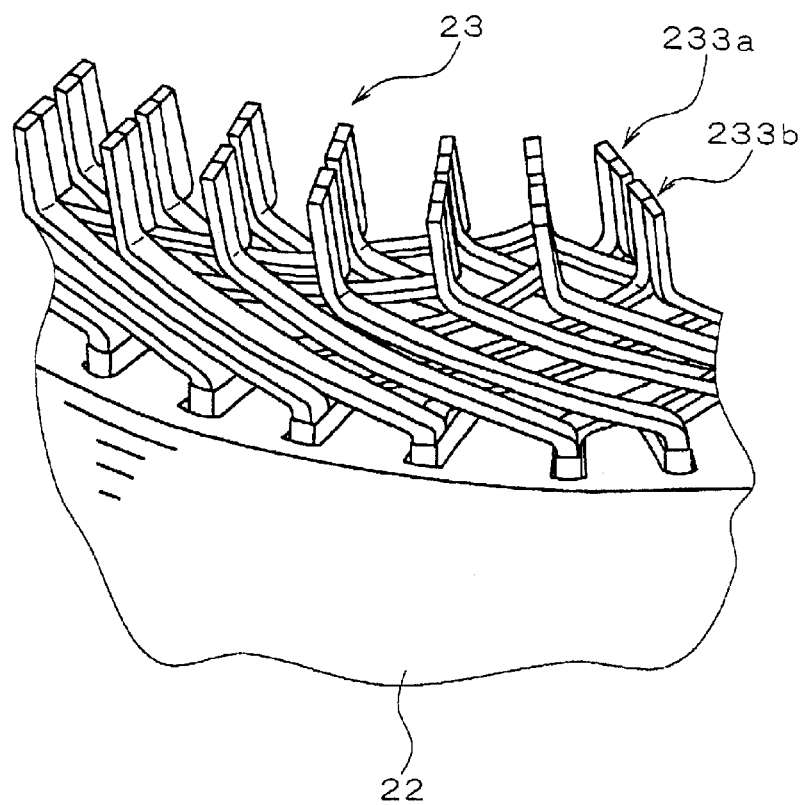
FIG. 10 is a perspective view showing a portion of the stator according to the second embodiment.

Therefore, at the other axial end of the stator core 22, as shown in FIG. 10, an outside connection portion 233b connecting the conductor member 231b' disposed at the outermost layer and the conductor member 232b disposed at the outer middle layer and an inside connection portion 233a connecting the conductor member 231a' disposed at the innermost layer and the conductor member 232a disposed at the inner middle layer are disposed to be shifted from each other in both the radial direction and the circumferential direction. The connection of the outermost conductor member 231b' and the outer middle conductor member 232b and the connection of the innermost conductor member 231a' and the inner middle conductor member 232a form two neighboring coil-end-layers that are disposed at two coaxial circumferences.

Figure 7:
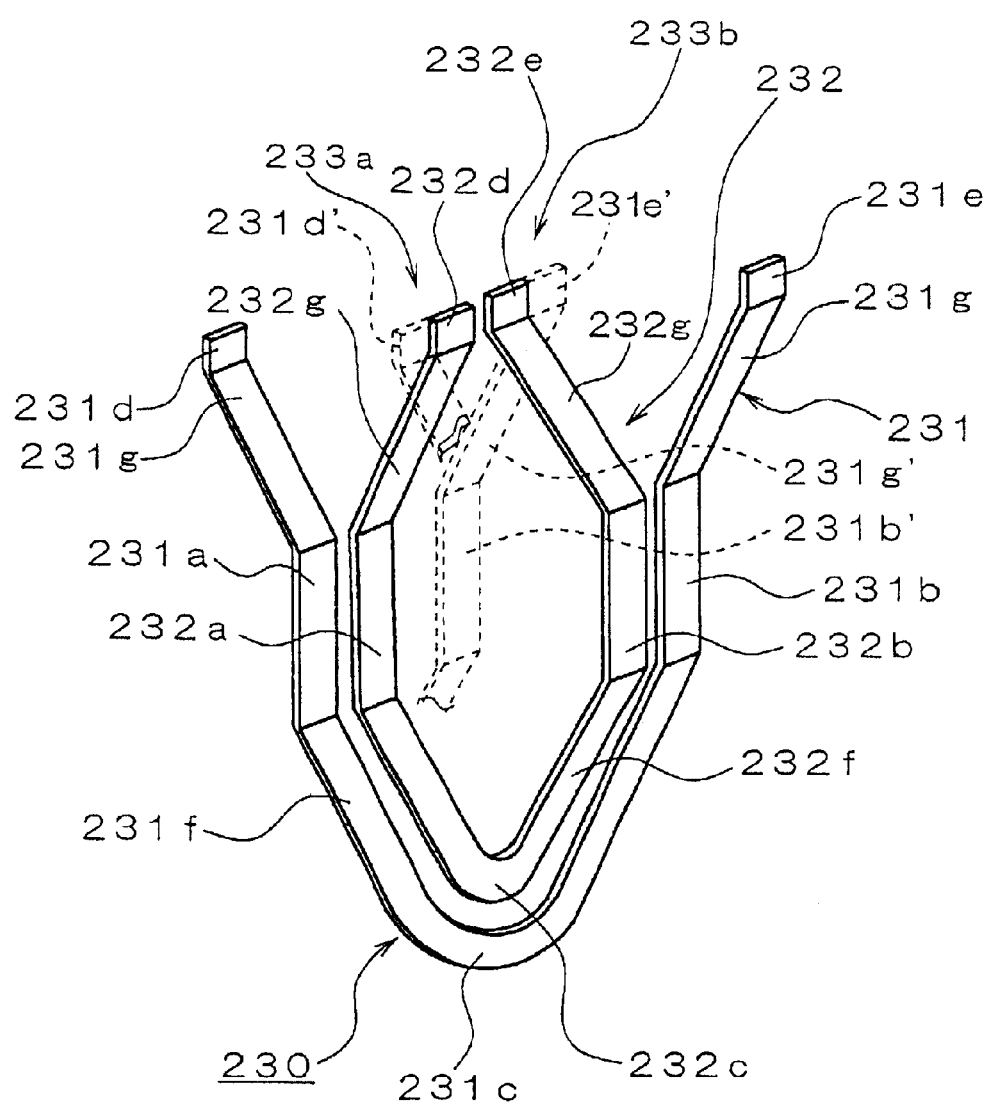
FIG. 7 is a perspective view of conductor segments that form an armature winding according to a second embodiment of the invention.
Figure 8:
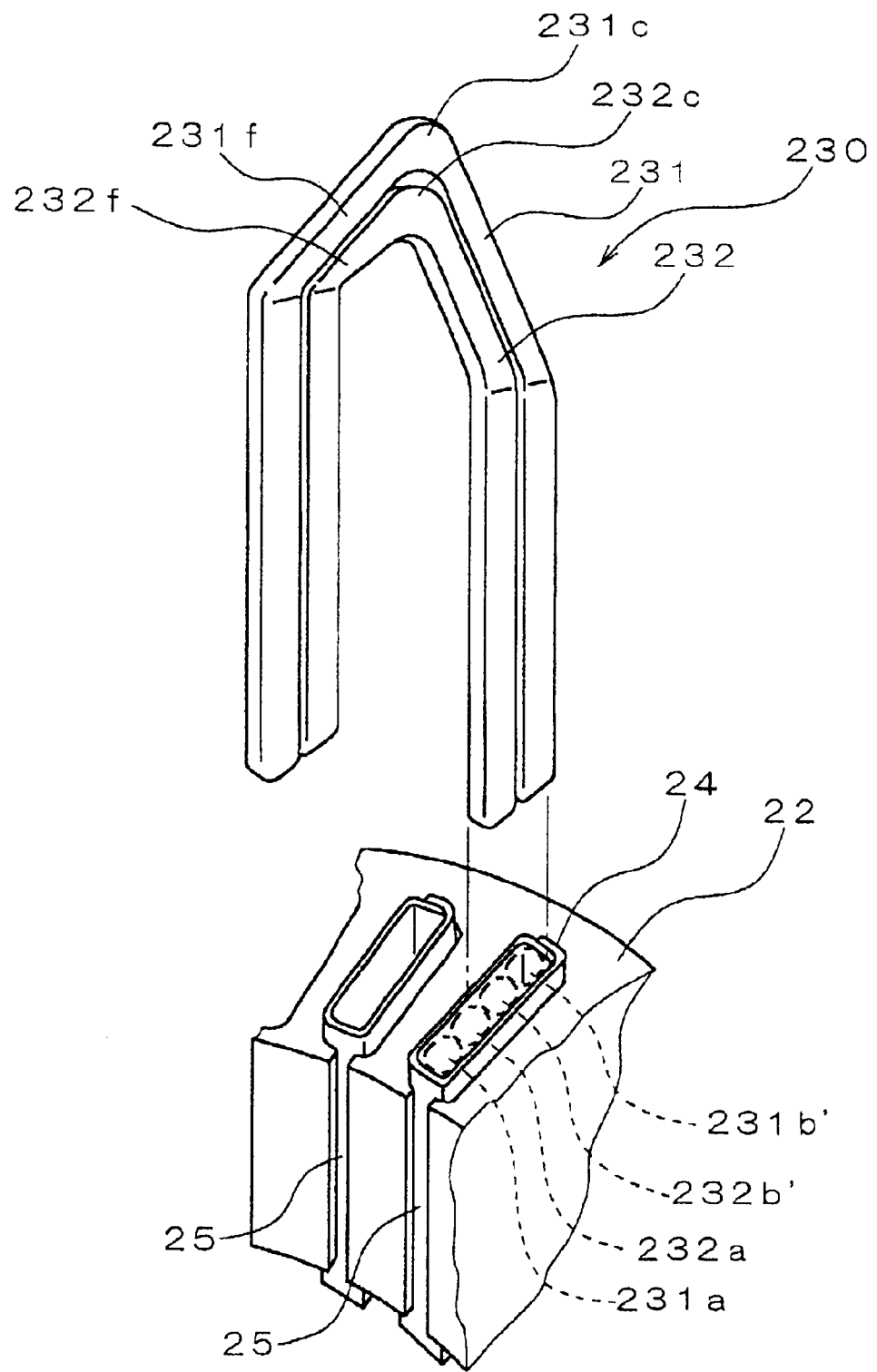
FIG. 8 is a perspective view of the conductor segments shown in FIG. 7 being assembled.
Figure 9:
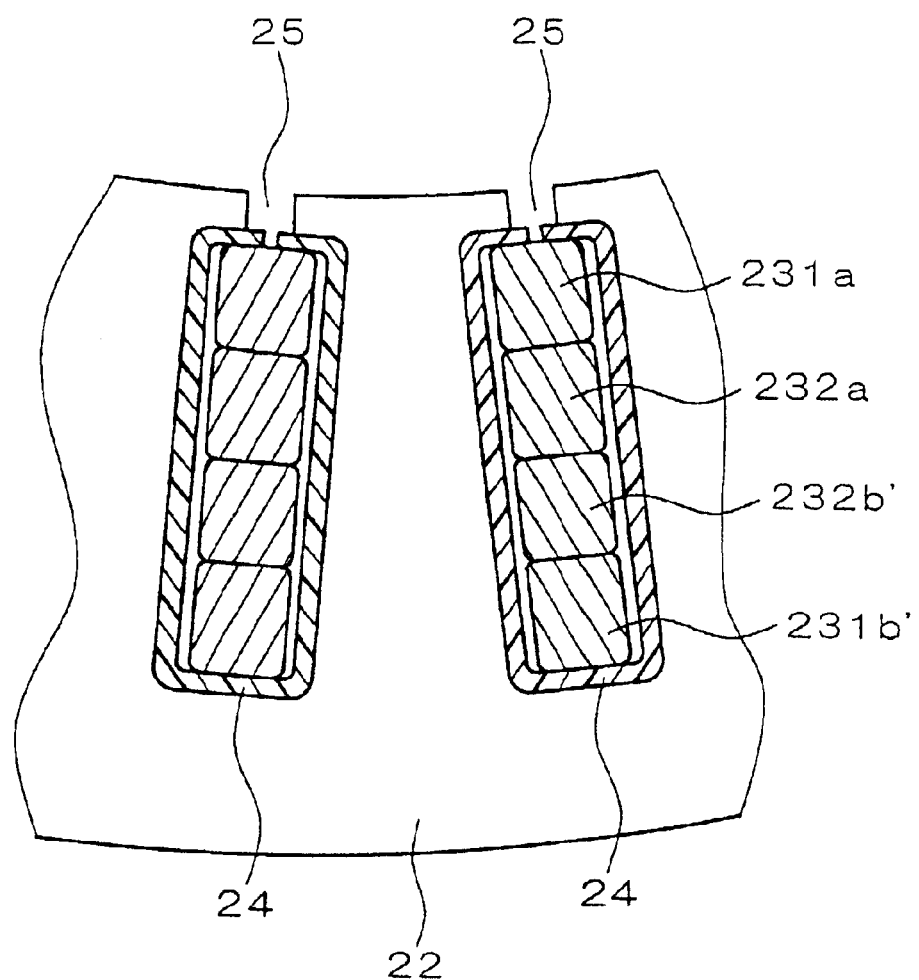
FIG. 9 is a schematic diagram of a portion of the stator according to the second embodiment.

As shown in FIG. 7, the conductor member 231a disposed in the innermost layer and the conductor member 231b disposed in the outermost layer form a U-shaped large conductor segment 231. The conductor member 232a disposed in the inner middle layer and the conductor member 232b disposed in the outer middle layer form a U-shaped small conductor segment 232. A basic conductor segment unit 230 is comprised of the large segment 231 and the small segment 232. Each of the large and small segments 231 and 232 is disposed in a slot and has portions that extend in the axial direction and inclined portions 231f, 231g, 232f and 232g that bends away from the axial direction. The inclined portions form coil ends that project from the opposite ends of the stator core 22, and cooling air passages are formed in the inclined portions when the mixed flow type cooling fan 11 and the centrifugal cooling fan 12, which are fixed to the opposite axial ends of the rotor 3, are rotated. The lead wires 27 of the armature winding 23 are also disposed in the cooling air passages.

The above-described arrangement is applied to the conductor segment units 230 disposed in all the slots 25. In the coil end group disposed opposite the turn portions the end portion 231e' of the conductor member disposed at the outermost layer and the end portion 232e of the conductor segment disposed at the outer middle layer as well as the end portion 232d of the conductor member disposed at the inner middle layer and the end portion 231d' of the conductor member disposed at the innermost layer are welded by a welder, such as a ultrasonic welder or an arc welder, or soldered to each other to form the outside connection portion 233b and the inside connection portion 233a for electrical connection.

The armature winding 23 of this embodiment, which is comprised of the conductor segment unit 230, has the same winding structure as the first embodiment shown in FIGS. 2–5. In this embodiment, six phase-windings that are π/6 in electric angle shifted from one another are disposed in every six of the slots 25 of the stator core 22 that correspond to a pole-pitch. U phase-winding disposed in one of the slots 25, V phase-winding and W phase-winding respectively disposed in other slots that are 4 or 8 slot-pitches spaced apart from the former one of the slots 25 are connected to form a Δ-connection three-phase winding 23A. X phase-winding, Y phase-winding and Z phase-winding are respectively mounted into those of the slots 25 that are respectively one slot-pitch spaced apart from the slots for the U phase-winding, V phase-winding and W phase-winding and respectively connected in series to the three connection portions of the three-phase winding 23A to form a three-phase winding 23B. Thus, the same armature winding as that of the first embodiment can be provided.

Because a pair of three-phase windings 23A and 23B of the armature winding 23 is connected in series, it is not necessary to equalize the induced voltages. Therefore, the number of turns of the respective three-phase windings can be set as desired. For example, the number of turns of both the three-phase windings 23A and 23B can be 4, as clearly shown in FIG. 9. Therefore, it is possible to provide the pair of three-phase windings 23A and 23B that is comprised of the same conductor segment units 230 and manufactured by the same bending and welding processes.

As shown in FIGS. 10 and 11, since a plurality of U-shaped conductor segment units are welded to form the armature winding 23, the coil ends of the armature winding 23 can be formed uniform or regular. Therefore, the conductor members can be made shorter, and the space factor of the conductor to the slot 25 can be improved. Accordingly, the resistance of the armature winding can be drastically reduced. As a result, a compact, powerful and highly efficient vehicle AC generator can be provided.

As in the vehicle AC generator according to the first embodiment, no circulation current flows in the armature winding. Further, since a pair of the three-phase windings 23A and 23B is disposed in the slots to be $\pi/6$ radian in electric angle shifted from each other, magnetic noise can be reduced.

Figure 12:
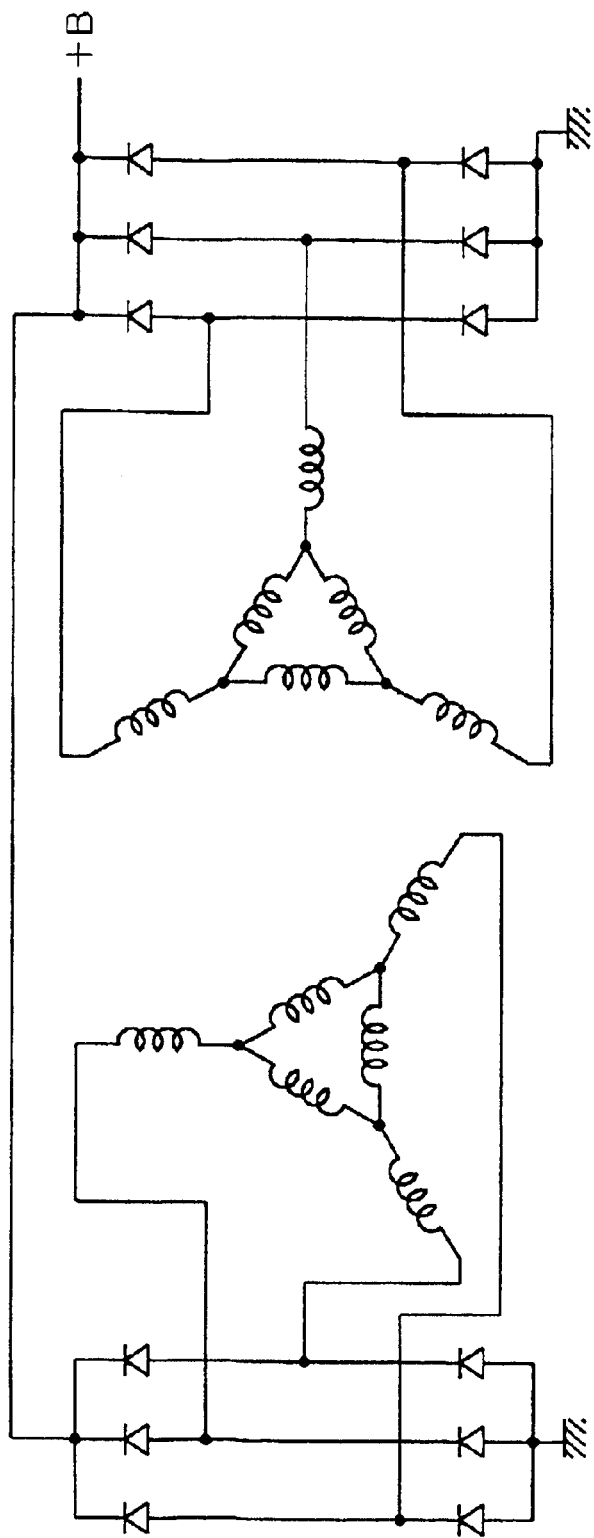
FIG. 12 is a wiring diagram of a variation of the stator according to the embodiments of the invention.

As exemplified in FIG. 12, it is possible to provide a vehicle AC generator in which a pair of the armature windings 23 according to the first or the second invention is shifted by $\pi/6$ radian in electric angle shifted from each other, and respectively connected to specific rectifier units. This structure can also reduce the magnetic noise further.

It is also possible to provide the three-phase windings 23A and 23B having the number of turns other than those described above. It is possible to apply this invention to some other rotary electric machine for a vehicle such as a motor to be mounted in a vehicle.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotary electric machine including a cylindrical stator core having an axial end surface, an armature winding mounted in said stator core, said armature winding having a first group of Δ-connected three phase-windings having junctions that are $2\pi/3$ in electric angle different from each other and a second group of three phase-windings having output ends that are $2\pi/3$ in electric angle different from each other and input ends respectively connected in series to said junctions of said first group, wherein each junction of said first group and one of said input ends of said second group connected thereto is disposed on the axial end surface to be predetermined distance spaced apart from another junction.

2. The rotary electric machine as claimed in claim 1, wherein each of said three-phase windings is mounted in said stator core so that the phase of current flowing in one phase winding is $\pi/6$ radian in electric angle different from the phase of current flowing in another phase-winding mounted adjacent thereto.

3. The rotary electric machine as claimed in claim 1, wherein each of said three-phase windings has approximately the same number of turns.

4. The rotary electric machine as claimed in claim 1, wherein said armature winding comprises a plurality of electric conductors welded together to form respective phase-windings.

5. The rotary electric machine as claimed in claim 4, wherein each of said electric conductor has a rectangular cross-section.

6. The rotary electric machine as claimed in claim 1, wherein said junctions of said first group are distributed at the axial end surface of said stator core in an angular range that is more than 180 degrees in mechanical angle.

7. The rotary electric machine as claimed in claim 6, further comprising lead wires that form said output ends of said second group, wherein said lead wires are extended so that they do not overlap one another.

8. The rotary electric machine as claimed in claim 6, wherein said first group comprises a plurality of lead wires extending in an arc along an axial end surface of said stator core at radially inside portion thereof to form said junctions.

9. The rotary electric machine as claimed in claim 1, further comprising a rectifier unit for rectifying voltages induced in said armature winding, wherein said output ends of said second group are connected to said rectifier unit.

10. A rotary electric machine, comprising:

a stator including a stator core and a three-phase armature winding mounted in the stator core;

a rotor having a plurality of magnetic poles; and a rectifier unit;

wherein said armature winding has a first group of Δ-connected three phase-windings having junctions that are $2\pi/3$ in electric angle different from each other and a second group of three phase-winding having output ends that are $2\pi/3$ in electric angle different from each other and input ends respectively connected in series to said junctions of said first group, and said junctions of said Δ-connection winding are distributed at an end surface of said stator core in an angular range that is more than 180 degrees in mechanical angle.

11. The rotary electric machine as claimed in claim 10, wherein said first and second groups of phase-windings are mounted in said stator core so that the phase of current flowing in said first group of phase-windings is $\pi/6$ radian in electric angle different from the phase of current flowing in said second group of phase windings.

12. The rotary electric machine as claimed in claim 10, wherein each of said first and second groups of phase-windings has the same number of turns.

13. The rotary electric machine as claimed in claim 10, wherein each of said first and second groups of phase-windings comprises a plurality of U-shaped conductor segments.

14. The rotary electric machine as claimed in claim 13, wherein each of said U-shaped conductor segments has a rectangular cross-section.

15. A rotary electric machine including a cylindrical stator core having an axial end surface, an armature winding mounted in said stator core, said armature winding having a first group of Δ-connected three phase-windings having junctions that are different in electric angle from each other and a second group of three phase-windings having output ends that are different in electric angle from each other and input ends respectively connected in series to said junctions of said first group, wherein each junction of said first group and one of said input ends of said second group connected thereto is disposed on the axial end surface to be predetermined distance spaced apart from another junction.

16. The rotary electric machine as claimed in claim 15, wherein each of said three-phase windings is mounted in said stator core so that the phase of current flowing in one phase winding is π/6 radian in electric angle different from the phase of current flowing in another phase-winding mounted adjacent thereto.

17. The rotary electric machine as claimed in claim 16, wherein each of said phase-windings has approximately the same number of turns.

18. The rotary electric machine as claimed in claim 15, wherein said armature winding comprises a plurality of electric conductors welded together to form respective phase-windings.

19. The rotary electric machine as claimed in claim 15, wherein said junctions of said first group are distributed at the axial end surface of said stator core in an angular range that is more than 180 degrees.

20. The rotary electric machine as claimed in claim 19, further comprising lead wires that form said output ends of said second group, wherein said lead wires are extended so that they do not overlap one another.

21. The rotary electric machine as claimed in claim 15, further comprising a rectifier unit for rectifying voltages induced in said armature winding, wherein said output ends of said second group are connected to said rectifier unit.

* * * * *